A. ISKE.
Feed and Vegetable Cutter.
No. 221,824.  Patented Nov. 18, 1879.
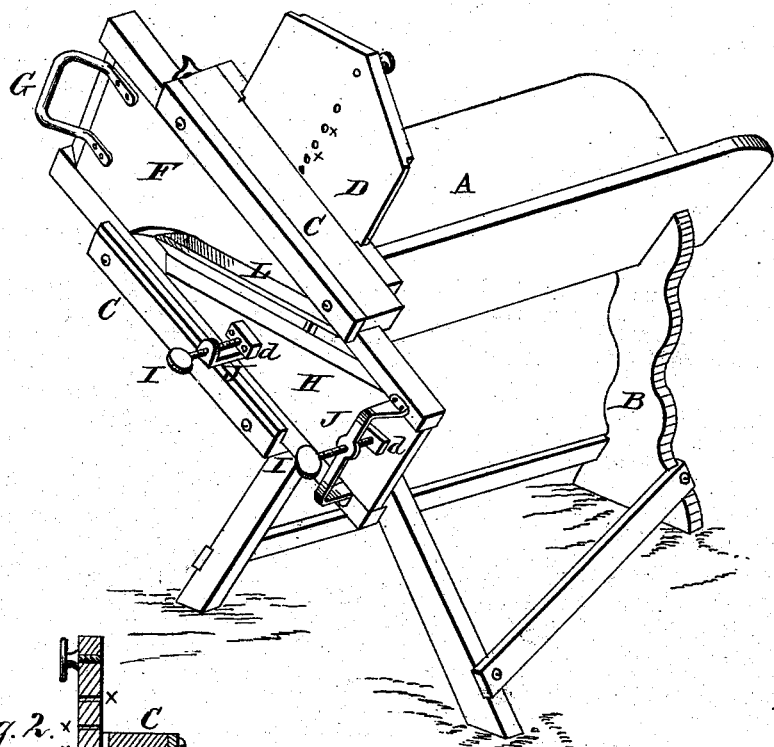
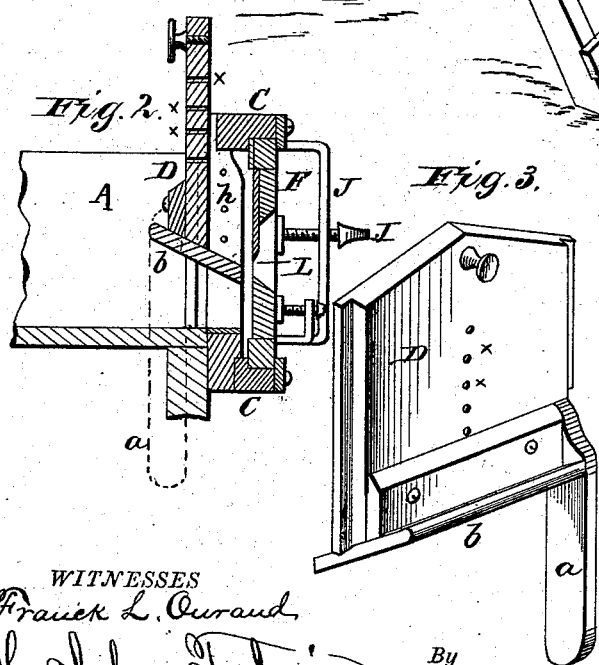

UNITED STATES PATENT OFFICE.

ANTHONY ISKE, OF LANCASTER, PENNSYLVANIA, ASSIGNOR TO ISRAEL L. LANDIS, OF SAME PLACE.

IMPROVEMENT IN FEED AND VEGETABLE CUTTERS.

Specification forming part of Letters Patent No. 221,824, dated November 18, 1879; application filed March 17, 1879.

*To all whom it may concern:*

Be it known that I, ANTHONY ISKE, of Lancaster, in the county of Lancaster, and in the State of Pennsylvania, have invented certain new and useful Improvements in Feed and Vegetable Cutters; and I do hereby declare that the following is a full, clear, and exact description thereof, reference being had to the accompanying drawings, and to the letters of reference marked thereon, making a part of this specification.

The nature of my invention consists in the construction and arrangement of a feed-cutter, as will be hereinafter more fully set forth.

In order to enable others skilled in the art to which my invention appertains to make and use the same, I will now proceed to describe its construction and operation, referring to the annexed drawings, in which—

Figure 1 is a perspective view of my feed-cutter. Fig. 2 is a cross-section thereof at the front end; and Fig. 3 is a perspective view of a gate used therein.

A represents an angular box or trough, supported upon suitable legs. At the front end of this trough is a frame, C, in which are placed the gate D and slide F. The lines of motion of this gate and slide are at right angles to each other, and correspond with the inclined sides of the trough.

The gate D is provided at one side with a guide-arm, $a$, projecting below the same through the trough, and the lower edge of the gate has an inclined board, $b$, attached to it, as shown in Figs. 2 and 3, to form a mouth for the passage of the material to be cut. The gate is further provided with a series of holes at $x$, so that a pin may be inserted and hold the gate at any height desired for the purpose of regulating the size of the mouth.

The slide F is at its upper end provided with a handle, G, for operating the same. At the other end, in said slide, is a loose board, H, which is held by means of screws I passing through brackets J J attached to the slide, and the inner ends of the screws swiveled in blocks $d$ $d$ fastened to the board.

L is the cutting-knife, attached in an inclined position to the body of the slide F, and by adjusting the board H the size of the throat is regulated so as to cut any size desired. When the slide is raised the material to be cut is fed against the board or gage H, and as the slide is pushed down on the incline it gives a draw-cut across the material and diagonally.

This machine may be used for a feed-cutter and a vegetable-cutter.

The mouth of the box or trough A is lined with metal $h$, as shown.

Having thus fully described my invention, what I claim as new, and desire to secure by Letters Patent, is—

1. In a feed and vegetable cutter, the combination of the angular box or trough A and the adjustable gate D, provided with guide-arm $a$ and board $b$, substantially as and for the purposes herein set forth.

2. The slide F, provided with the inclined knife L, and the gage H, adjustable to and from the knives by means of the swiveled screws I and brackets J, as and for the purposes herein set forth.

In testimony that I claim the foregoing I have hereunto set my hand this 24th day of February, 1879.

ANTHONY ISKE.

Witnesses:
JNO. T. MACGONIGLE,
WILLIAM TITUS.